US005543829A

United States Patent [19]
Fisli

[11] Patent Number: 5,543,829
[45] Date of Patent: Aug. 6, 1996

[54] METHOD AND APPARATUS FOR ADJUSTING THE CURVATURE OF A FOLDING MIRROR IN A RASTER SCANNING SYSTEM

[75] Inventor: Tibor Fisli, Los Altos Hills, Calif.

[73] Assignee: Xerox Corporation, Stamford, Conn.

[21] Appl. No.: 325,017

[22] Filed: Oct. 19, 1994

[51] Int. Cl.$^6$ .................................................. B41J 2/47
[52] U.S. Cl. ............................................ 347/241; 347/257
[58] Field of Search ................................. 347/256, 257, 347/260, 241, 242

[56] References Cited

U.S. PATENT DOCUMENTS

| | | |
|---|---|---|
| 4,474,422 | 10/1984 | Kitamura . |
| 4,847,642 | 7/1989 | Murayama et al. . |
| 4,903,067 | 2/1990 | Murayama et al. . |
| 5,048,904 | 9/1991 | Montagu ................................. 347/257 |
| 5,233,367 | 8/1993 | Curry . |
| 5,243,359 | 9/1993 | Fisli . |
| 5,341,158 | 8/1994 | Appel et al. . |

OTHER PUBLICATIONS

"Laser Scanning for Electronic Printing" *Proceedings of the IEEE*, vol. 70, No. 6, Jun. 1982, pp. 597–618, by John C. Urbach et al.

*Primary Examiner*—Mark J. Reinhart
*Attorney, Agent, or Firm*—Oliff & Berridge

[57] ABSTRACT

A raster scanning system has an image receiving device that receives a light beam, a scanning device for scanning the light beam across the image receiving device and a mirror located in the path of the light beam between the scanning device and the image receiving device for directing the light beam to the image receiving device. An adjusting device adjusts a curvature of the mirror to correct for bow of the light beam on the image receiving device.

18 Claims, 7 Drawing Sheets

METHOD AND APPARATUS FOR ADJUSTING THE CURVATURE OF A FOLDING MIRROR IN A RASTER SCANNING SYSTEM

BACKGROUND OF THE INVENTION

1. Field of the Invention

This invention relates generally to an apparatus and method for adjusting the curvature of a mirror in a raster scanning system. More particularly, this invention relates to adjusting the curvature of a mirror to correct for differential bow in a raster scanning system.

2. Description of Related Art

Flying spot scanners (often referred to as raster output scanners or ROSs) conventionally have a reflective multi-faceted polygon mirror that is rotated about its central axis to repeatedly sweep one or more intensity modulated beams of light across a photosensitive recording medium in a fast scan direction while the recording medium is being advanced in the slow scan direction. The beam scans the recording medium based on a raster scanning pattern. Digital printing is performed by serially intensity modulating each of the beams in accordance with the binary sample string. Printers that sweep several beams simultaneously are referred to as multi-beam printers. Both ROS and multi-beam printer techniques are illustrated in U.S. Pat. No. 4,474,422 to Kitamura, the subject matter of which is incorporated herein by reference.

High speed process color or multi-highlight color xerographic image output terminals require multiple independently addressable raster lines to be printed simultaneously at separate exposure stations. This is called multi-station printing. Conventional architectures for multi-station process color printers use a plurality of separate ROSs, usually four independent ROSs, one for each system color as illustrated in U.S. Pat. Nos. 4,847,642 and 4,903,067 to Murayama et al., the disclosures of which are incorporated herein by reference.

The problems with these systems are the high cost of multiple ROSs, the high cost of producing nearly identical multiple ROSs and associated optics, and the difficulty of registering the system colors.

Figure 1:
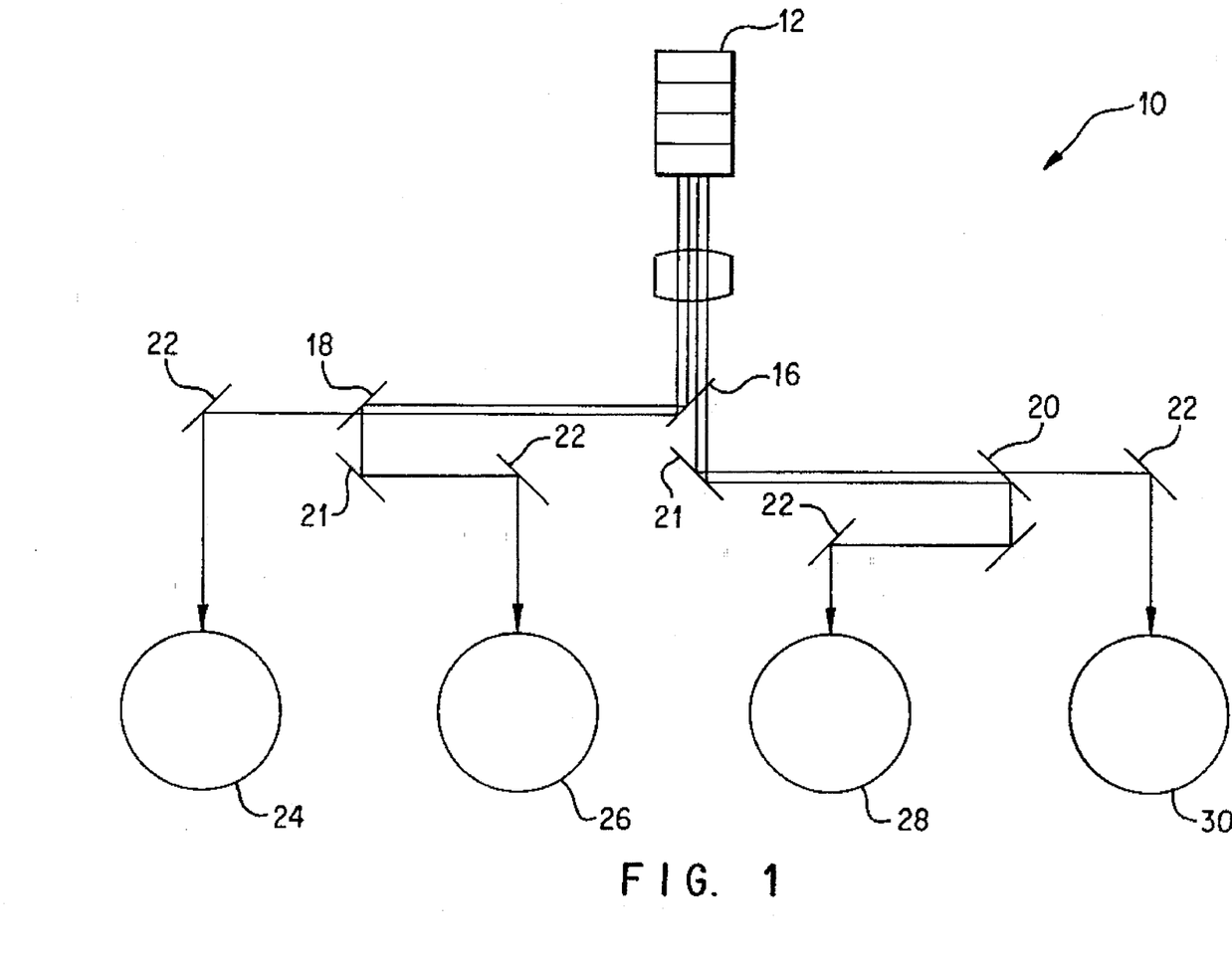
FIG. 1 is a schematic view of a multi-station raster output scanner.

U.S. Pat. No. 5,243,359 to Tibor Fisli, the disclosure of which is incorporated herein by reference, discloses a ROS system suitable for deflecting multiple laser beams in a multi-station printer. FIG. 1 illustrates one embodiment of Fisli's multi-station printer 10. A rotating polygon mirror 12 simultaneously deflects a plurality of clustered, dissimilar wavelength laser beams, having their largest divergent angles parallel to one another. The laser beams are subsequently separated by a plurality of optical filters 16, 18 and 20 and are directed onto respective photoreceptors 24, 26, 28 and 30 using mirrors 21 and 22. Similarly dimensioned spots are obtained on each photoreceptor 24, 26, 28 and 30 by establishing similar optical path lengths for each beam. The laser diodes in U.S. Pat. No. 5,243,359 are arranged in the slow scan direction (i.e., sagittally offset). Diodes arranged in the slow scan direction must be arranged such that they are packed closely in a direction parallel to the polygon mirror's rotational axis to minimize beam characteristic deviations such as spot size, energy uniformity, bow and linearity. Thus, the laser diodes are kept as closely as possible in the direction parallel to the polygon mirror's rotational axis so that the light beams strike nearly the same portion of the polygon mirror as possible.

U.S. Pat. No. 5,341,158 to James Appel et al., the disclosure of which is incorporated herein by reference, discloses a ROS system in which the laser beams are tangentially offset (i.e., separated in the fast scan direction) to offset the laser diode spacing constraints of U.S. Pat. No. 5,243,359 to Fisli.

In single spot rotating polygon based optical systems, bow distortions occur from the accumulation of optic tolerances. Bow is the curved line described by the scanned laser beam of the ROS as the laser beam moves in the fast scan direction. Bow appears as a displacement of the scan line in the process direction as the line extends in the fast scan direction.

Although multi-beam, laser diode based ROS is viewed as the most powerful technology for high quality xerographic printing, differential scan line bow remains an undesirable side effect. Differential scan line bow rises from the very nature of multi-beam optic systems, where the beams are offset sagittally (i.e., in the slow scan direction). The bow occurs because the magnification of the optical system varies across each sagittal plane as each of the sagittally offset beams propagate through the optical system.

Depending on the design of the system, the differential scan line bow can cause scan lines to move towards each other (barrel distortion) or away from each other (pincushion distortion). In both cases, the light sources are on opposite sides of the optical axis. Therefore, the centers of curvature of the bowed scan lines are also on opposite sides of the optical axis.

Figure 5A:
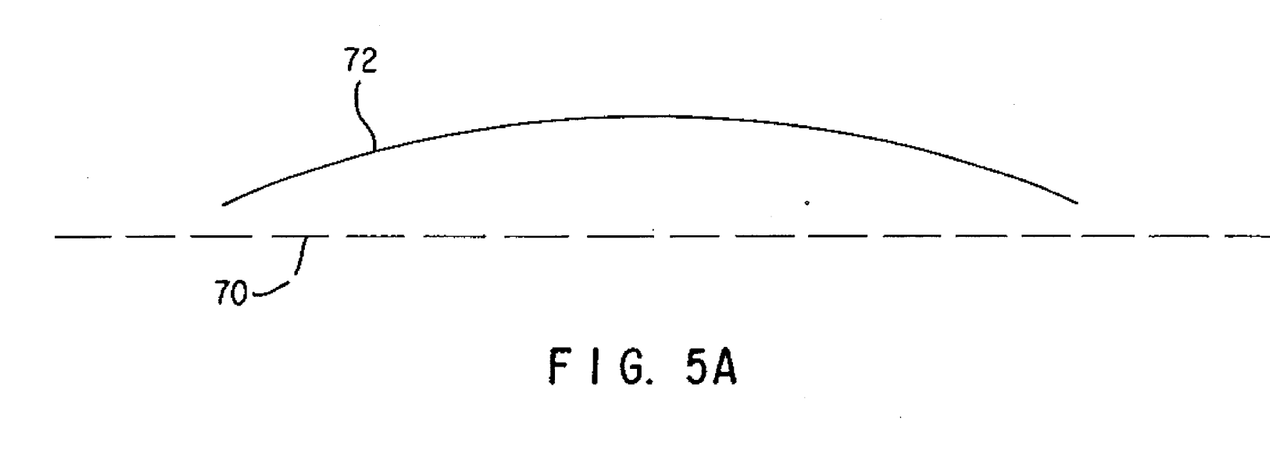
FIG. 5A shows a scan line having bow.
Figure 5B:
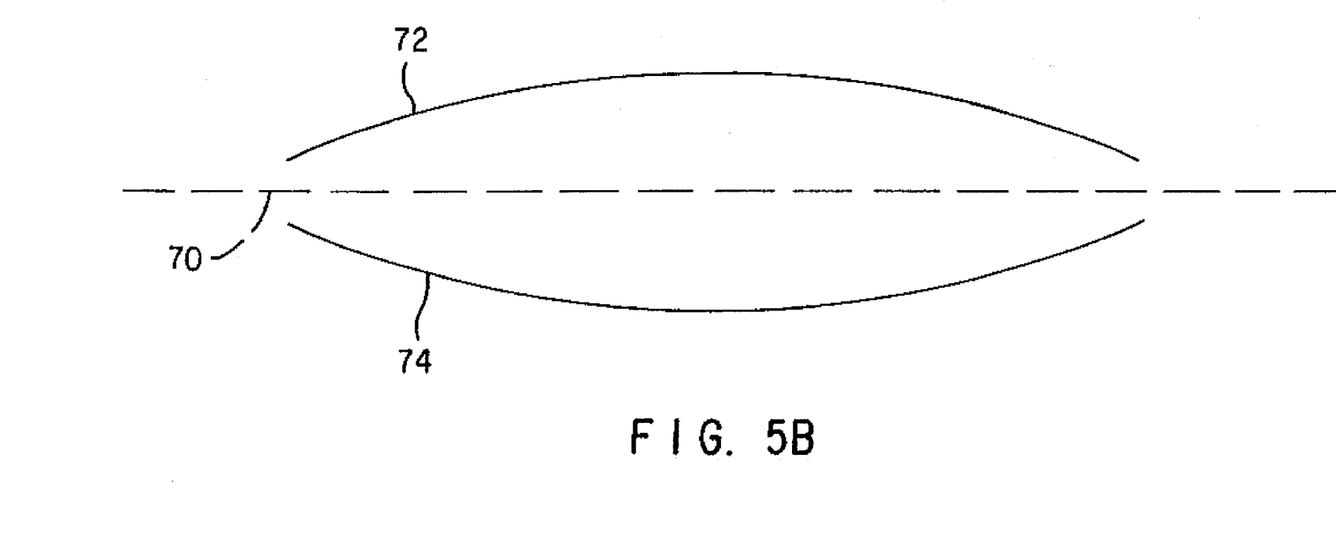
FIGS. 5B and 5C show a pair of scan lines having differential bow.
Figure 5C:
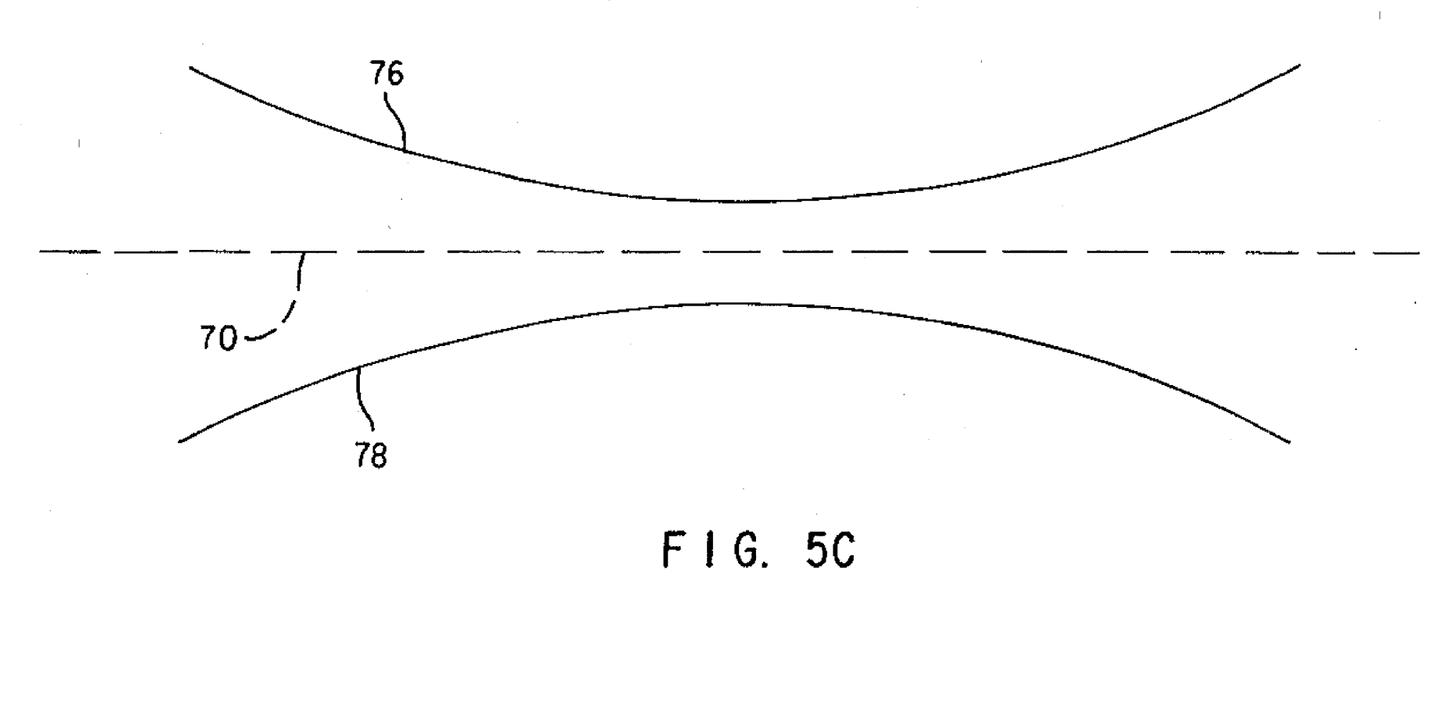

FIGS. 5A–5C show the problems of differential scan line bow on the surface of a photoreceptor. The ideal scan line 70 is shown as a dashed line. In FIG. 5A, the bowed scan line 72 results from the scanning of the laser beam off the optical axis. When differential bow is not corrected, a printed line may be curved rather than straight. Such errors are generally visible to the human eye.

FIG. 5B shows differential bow in a dual spot ROS. As is well known in the art, a dual spot ROS simultaneously images two spots on a single photoreceptor. In such a ROS, two types of differential bows may occur. In FIG. 5B, a second scan line 74 is created that has a radius of curvature different from the radius of curvature of the first scan line 72. In FIG. 5B, the centers of curvature of the bowed scanned lines 72 and 74 are on opposite sides of the ideal scan lines 70 and create a pincushion distortion.

FIG. 5C shows the bowed scan lines 76 and 78 having centers of curvature on opposite sides of the ideal scan line 70 to create a barrel distortion.

U.S. patent application Ser. No. 08/174,917 to Tibor Fisli et al., filed Dec. 29, 1993, the disclosure of which is incorporated herein by reference, provides a multi-beam ROS in which the chief exit rays from the optical system to the photoreceptor are telocentric. By providing telocentric chief exit rays, the multi-beam system becomes both tolerant to pyramidal polygon angular errors and is able to maintain adequately stable, essentially no bow performance over an acceptable depth of focus in the single station xerographic printer. In addition, by closely controlling the overall shape and orientation of the bow, single pass, multi-station systems are able to print with acceptable levels of misregistration between the various images written on the widely separated xerographic stations.

Figure 2:
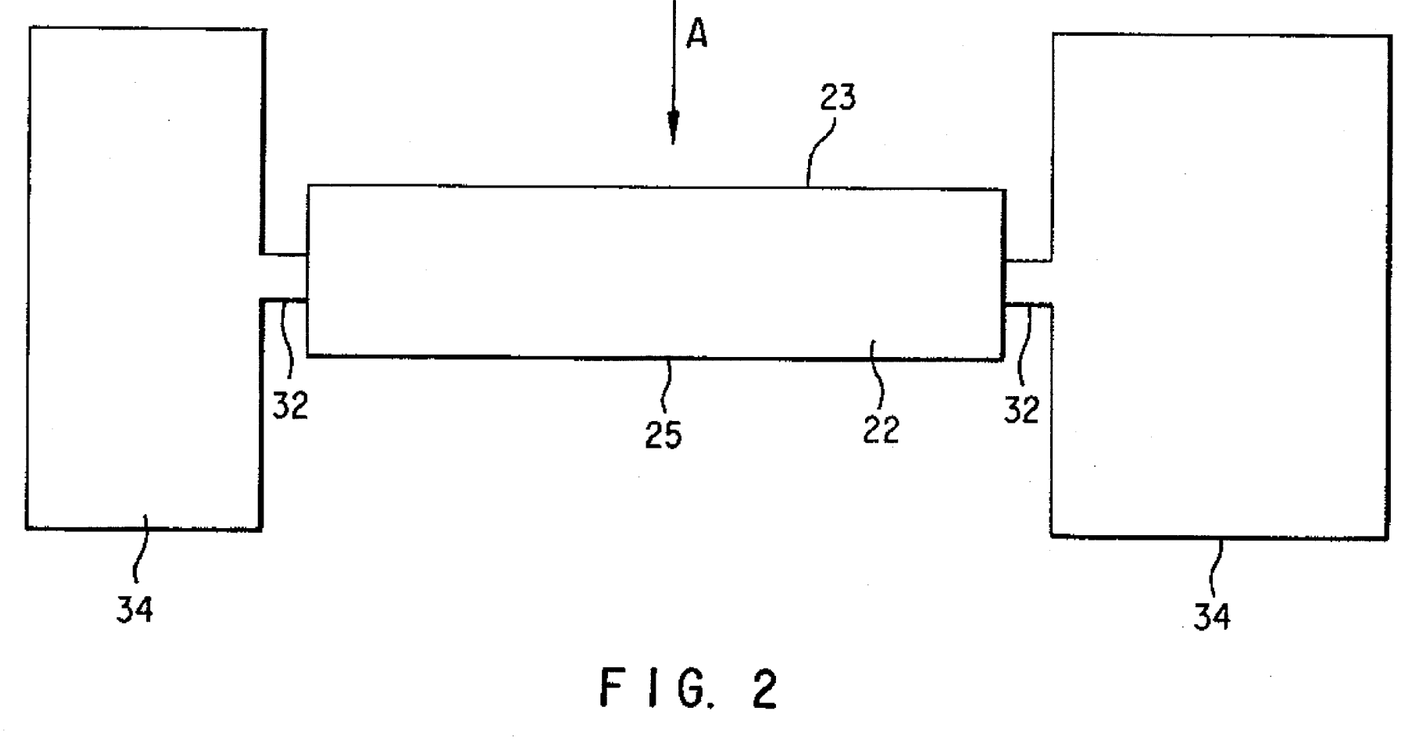
FIG. 2 is a top view of a prior art mirror and holding members used in a raster output scanner.

FIG. 2 shows a top view of a prior art apparatus for mounting mirrors 22 in a ROS system such as that of FIG. 1. Each mirror 22 is mounted such that the reflective front surface 23 faces the incoming light beam while the rear surface 25 faces an opposite direction. The holding members 34 are securely attached to a mounting board (not shown in FIG. 2). The holding members 34 may include arms 32 that extend into contact with longitudinal ends of the mirror 22. The mirror 22 may be attached to the arms 32 using attaching clips, cement or other types of attaching devices as is well known in the art. However, the mirror 22 in an undeformed mode is unable to correct any differential bow problems.

SUMMARY OF THE INVENTION

This invention provides for an optical system that corrects for differential bow problems by adjusting the curvature of a mirror.

Thus, this invention provides a raster scanning system having an image receiving device for receiving a light beam, a scanning device for scanning a light beam across the image receiving device, a mirror located in a path of the light beam between the scanning device and the image receiving device, and an adjusting device for adjusting the curvature of the mirror.

Additionally, this invention provides a method for correcting bow in a raster scanning system. A light beam is scanned onto an image receiving member and the curvature of a mirror is adjusted. The adjusted curvature of the mirror substantially eliminates the bow of the light beam on the image receiving member.

Other objects, advantages and salient features of the invention will become apparent from the following detailed description taken in conjunction with the annexed drawings, which disclose preferred embodiments of the invention.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

Figure 3:
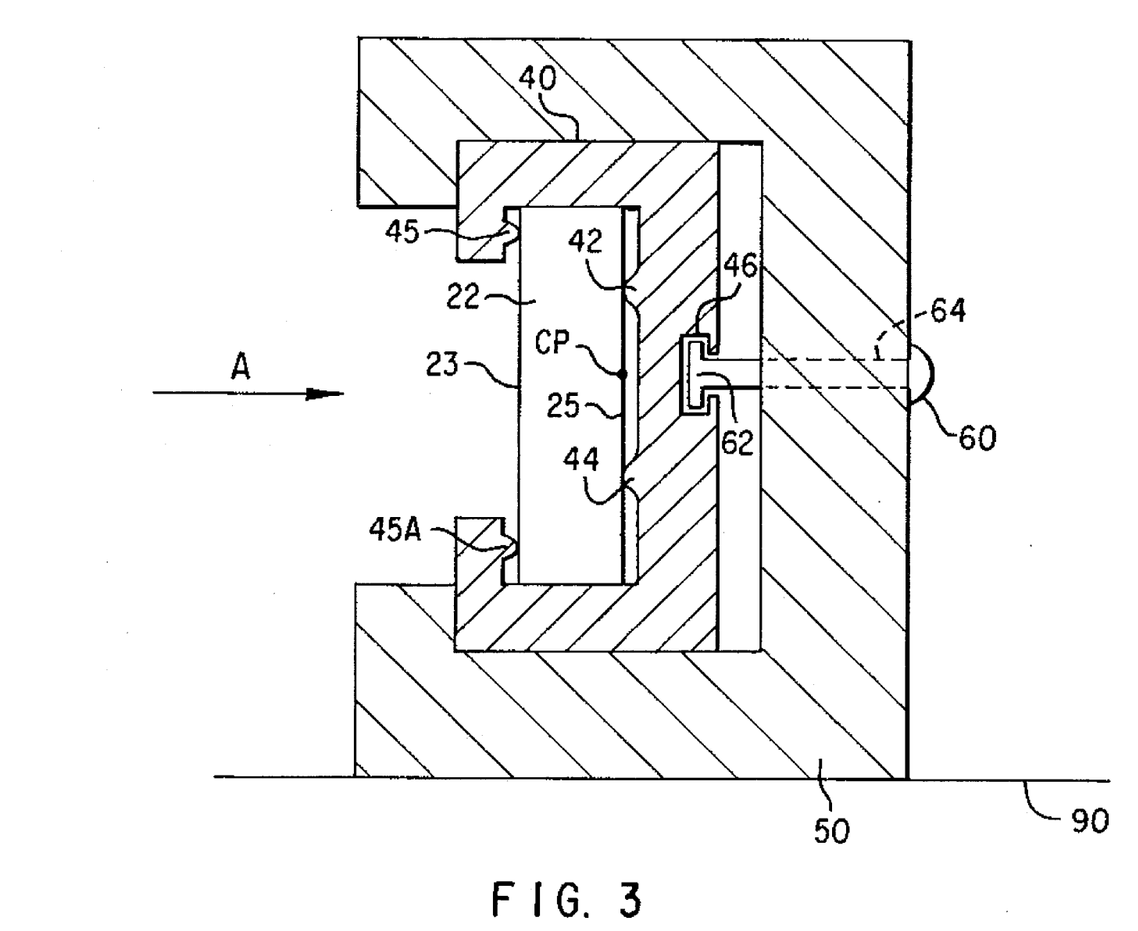
FIG. 3 is a mirror and adjusting device according to a preferred embodiment of the present invention.
Figure 4A:
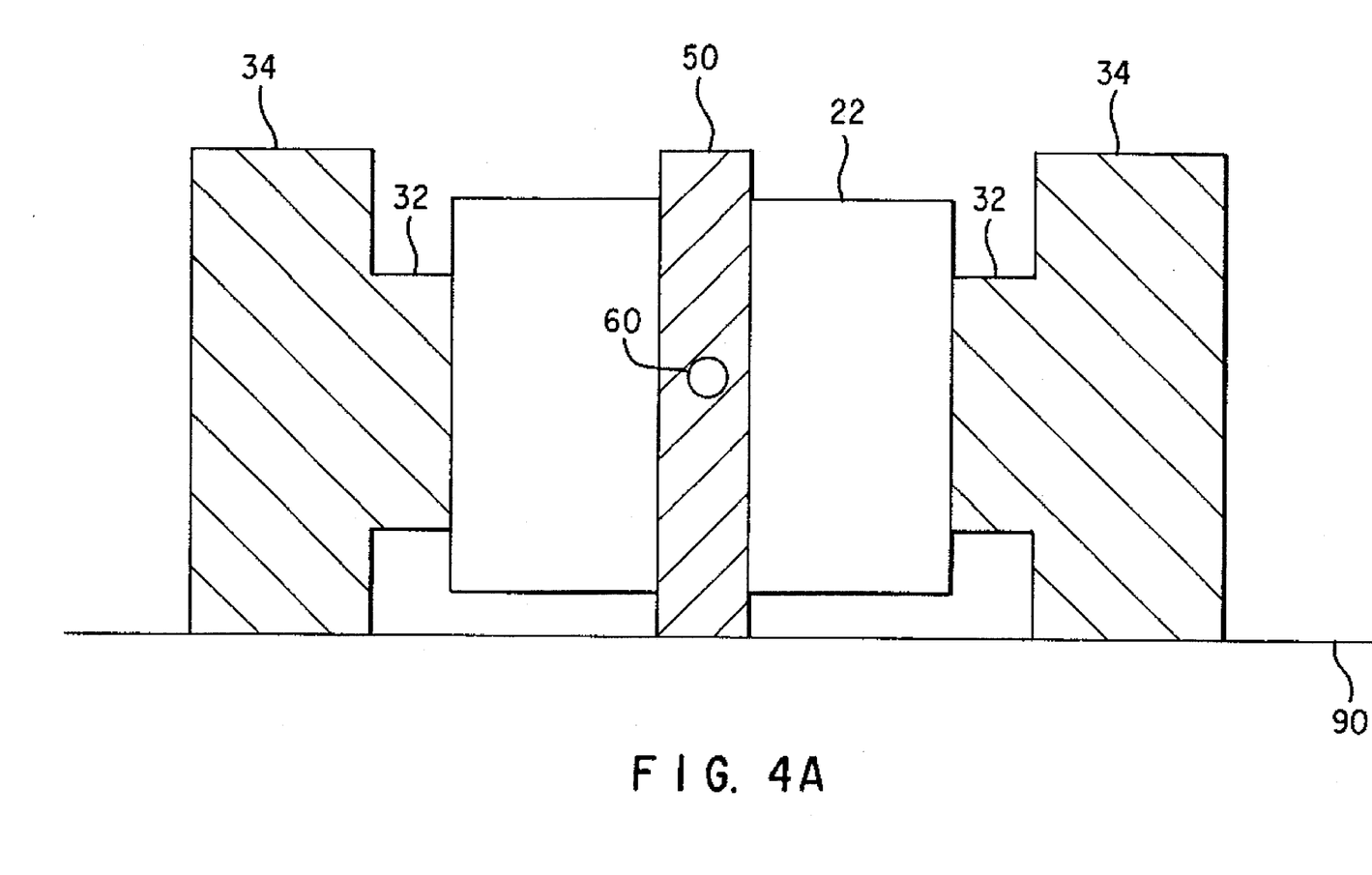
FIG. 4A is a rear view of the mirror and adjusting device according to a preferred embodiment of the present invention.
Figure 4B:
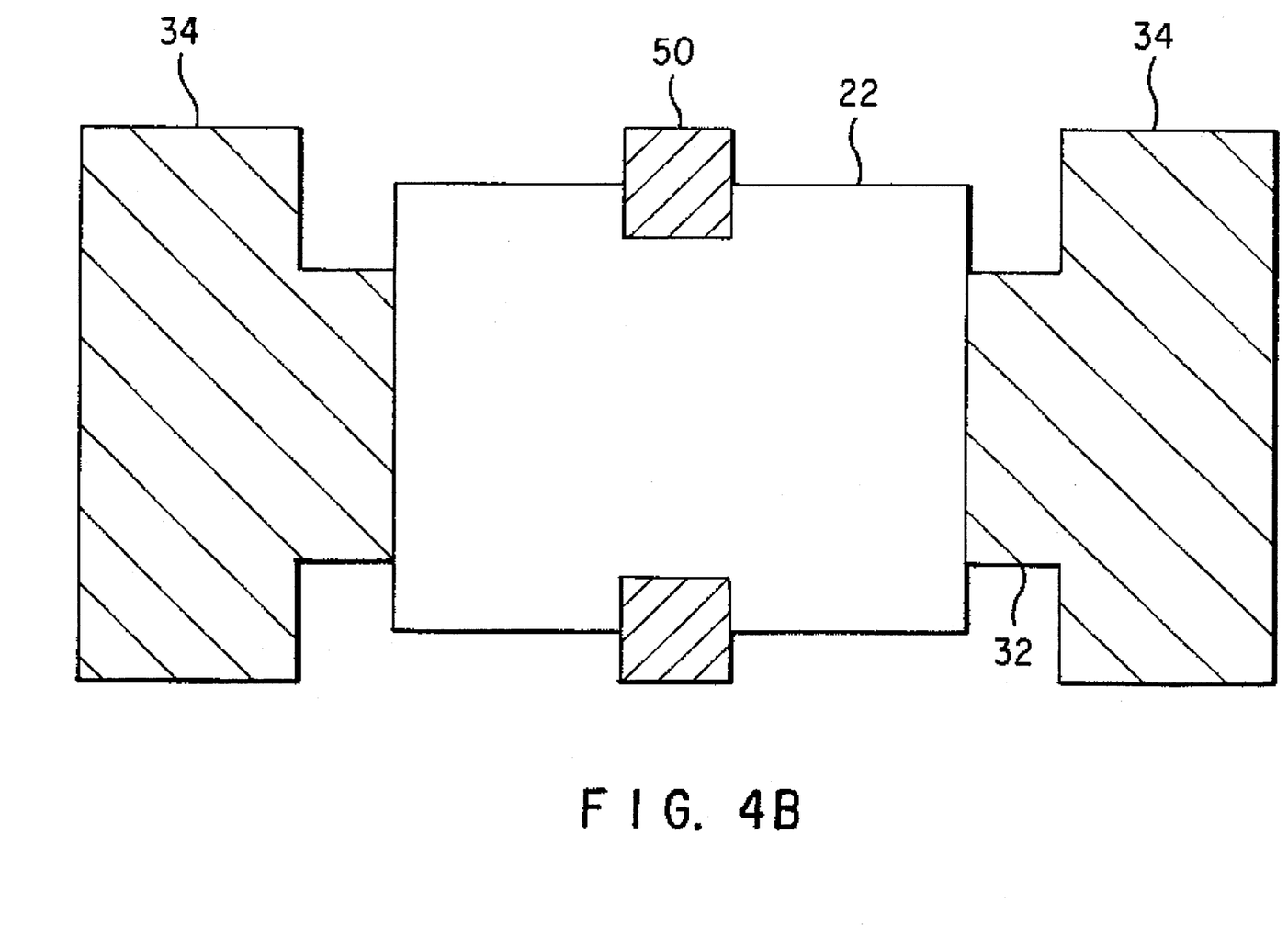
FIG. 4B is a front view of the mirror and adjusting device of a preferred embodiment of the present invention.

FIG. 3 shows the end view of an adjusting device that adjusts a curvature of the mirror 22. The adjusting device includes a mounting device 50 and a bending device 40 positioned at a center location of the mirror 22 between longitudinal ends of the mirror 22. The mirror 22 is additionally securely attached at its longitudinal ends to the holding members 34 as shown in FIGS. 4A and 4B. FIGS. 4A and 4B additionally show the central location of the mounting device 50. Therefore, the mirror 22 is fixed at its longitudinal ends but is capable of bending along its longitudinal axis, the amount of the bending is adjusted by the adjusting device as described below.

The bending device 40 contacts and holds the mirror 22 preferably using abutments 42, 44, 45 and 45A. The rear surface 25 of the mirror 22 has a central longitudinal axis and a central transverse axis which intersect at a center point CP of the mirror 22. The abutments 42 and 44 preferably are located in line with the central transverse axis, with each pair equally spaced from the center point CP. As is shown in FIG. 3, the bending device 40 includes rear abutments 42 and 44 contacting the rear surface 25 of the mirror 22 on opposite sides of the center point CP of the mirror 22. The bending device 40 may additionally include two abutments 45 and 45A contacting a front surface 23 of the mirror 22 on opposite sides of the center point CP at locations near the top and bottom edges of the mirror 22. The abutments 42, 44, 45 and 45A are preferably made of soft metal such as aluminum to prevent the mirror 22 from breaking when force is applied by the bending device 40 to adjust the curvature of the mirror 22. Other embodiments of the abutments 42, 44, 45 and 45A are also within the scope of this invention.

The mounting device 50 surrounds the bending device 40. As illustrated in FIG. 4A, the mounting device 50 is preferably secured to a mounting board 90 and allows movement of the bending device 40 relative to the mounting board 90 as will be described below. FIG. 4A shows a rear view of the mirror 22 and the mounting device 50 with the mounting device 50 located around a center portion of the mirror 22. Preferably, the mounting device 50 extends along the rear surface between the top surface and the front surface of the mirror 22. The bending device 40 is not visible from the rear view because the mounting device 50 preferably surrounds the bending device 40.

The mounting device 50 preferably includes a setting screw 60 that is aligned with the center point CP and extends through the mounting device 50 to the bending device 40. As shown in FIG. 3, the setting screw 60 may include a threaded section 64 received within a threaded hole of the mounting device and a recessed portion 62 received within a recess 46 of the bending device 40. The recessed portion 46 is a "T-shape" to control movement of the bending device 40 relative to the mounting device 50. That is, because the threaded section 64 is received within the threaded hole of the mounting device 50, different angular rotations of the setting screw 60 cause the recessed part 62, and thus the bending device 40, to move in a direction of arrow A or in an opposite direction of arrow A depending on the direction of the angular rotation.

As is shown in FIG. 4A and 4B, the mounting device 50 and thus the bending device 40 are located around a center portion of the mirror 22 (i.e., the area near the center point CP). Thus, when the setting screw 60 is appropriately adjusted, the bending device 40 applies a force to the mirror 22 to thereby either "push" or "pull" the center portion of the mirror 22. It has been found that such "pushing" and "pulling" by the bending device 40 results in an adjustment of the curvature of the mirror 22 due to bending of the longitudinal axis. That is, the position of the center point CP will move a certain distance out of the plane defined by the longitudinal ends of the mirror, to create a "bow" or "bend" in the mirror 22. Typical folding mirrors 22 are capable of easily being adjusted in sag by up to 2 mm, depending on the width and the length of the mirror. However, movements of only a fraction of a millimeter are sufficient to correct for bow problems.

The bending device 40 and the mounting device 50 preferably adjust the curvature of the last mirror 22 in an optical channel before the light beam impinges on a photoreceptor. However, the present invention can be used with any mirror in the optical system.

Thus, differential bow can be corrected by introducing a compensating bow within any of the mirrors 22 of an optical system using the above-described apparatus and method. When the compensating bow is introduced, the mirror 22 assumes either a uniform concave form or a uniform convex form. Using computer analysis, it has been found that a 14 micron bow in a mirror can eliminate a 9.3 micron bow in the optical system.

The setting screw 60 is preferably adjusted by a user after first determining the amount of bow in an optical system. This can be done by first allowing a light beam to reflect from the mirror and scan onto a photoreceptor. The bow can then be determined and measured as is well-known in the art. The setting screw 60 is then appropriately adjusted using the above described method and apparatus to correct for the bow. The light beam is then reflected from the mirror and scanned across the photoreceptor with the compensated bow introduced into the mirror. Again, the bow is determined and measured. If necessary, the setting screw 60 is then again adjusted until the bow is substantionally eliminated. This process is repeated for each of the four channels of the color printing system shown in FIG. 1. Other methods of determining the bow are also within the scope of this invention.

While the invention has been described with reference to specific embodiments, the description of these embodiments is illustrative only and is not to be construed as limiting the scope of the invention. Various other modifications and changes may occur to those skilled in the art without departing from the spirit and scope of the invention.

What is claimed is:

1. A raster scanning system comprising:

an image receiving device for receiving a light beam;

a scanning device for scanning said light beam across said image receiving device; and a mirror located in a path of said light beam between said scanning device and said image receiving device, a curvature of the mirror being adjustably controlled to eliminate bow of the light beam on the image receiving device, the curvature of the mirror being adjusted to receive a bowed light beam and reflect the light beam with the bow removed.

2. A raster scanning system comprising:

an image receiving device for receiving a light beam;

a scanning device for scanning said light beam across said image receiving device;

a mirror, located in a path of said light beam between said scanning device and said image receiving device, for directing said light beam to said image receiving device; and an adjusting device mounted on the mirror for adjusting a curvature of said mirror.

3. The raster scanning system of claim 2, wherein the mirror is a parallel glass mirror having a front surface for reflecting the light beam to said image receiving member and a rear surface located on an opposite side of said mirror from the front surface.

4. The raster scanning system of claim 3, wherein the mirror extends in a longitudinal direction and has fixed longitudinal ends.

5. The raster scanning system of claim 4, wherein the adjusting device is located in a central position of the mirror between the longitudinal ends of said mirror.

6. The raster scanning system of claim 5, wherein the adjusting device includes at least one abutment contacting the rear surface of the mirror to apply force to the rear surface of said mirror to adjust the curvature of the mirror.

7. The raster scanning system of claim 5, wherein the adjusting device includes at least one abutment contacting the front surface of the mirror to apply force to the front surface of said mirror to adjust the curvature of the mirror.

8. The raster scanning system of claim 5, wherein the adjusting device comprises:

a mounting device fixed in the central position of the mirror; and a bending device contacting the mirror and supported by the mounting device for movement relative to a longitudinal plane defined by longitudinal ends of the mirror, movement of the bending device relative to the mounting device adjusting the curvature of the mirror.

9. The raster scanning system of claim 8, wherein the mounting device comprises:

at least one setting screw that contacts said bending device and adjusts a position of the bending device relative to the mounting device.

10. The raster scanning device of claim 8, wherein the bending device contacts said mirror at a central portion of said mirror.

11. The raster scanning device of claim 8, wherein the bending device comprises at least one abutment contacting said mirror.

12. The raster scanning device of claim 11, wherein the at least one abutment contacts said mirror at the central position of said mirror.

13. The raster scanning device of claim 2, wherein the image receiving device comprises a photoreceptor.

14. The raster scanning device of claim 2, wherein the scanning device comprises a polygon mirror.

15. The raster scanning device of claim 2, wherein the adjusting device compensates for bow of the light beam on the image receiving device by adjusting the curvature of the mirror.

16. A printer comprising:

a light emitting device for emitting a light beam;

a photoreceptor receiving the light beam emitted from the light emitting device;

a folding mirror, disposed in a path of said light beam between said light emitting device and said photoreceptor, the folding mirror reflecting the light beam to said photoreceptor; and a curvature adjusting device that adjusts the curvature of the folding mirror to compensate for bow of the light beam on the photoreceptor.

17. A method for correcting bow in a raster scanning system, the method comprising the steps of:

scanning a light beam across an image receiving member;

positioning a mirror in a light path to reflect the light beam toward the image receiving member; and adjusting a curvature of the mirror to compensate for bow of said light beam on said image receiving member.

18. The method of claim 17, wherein the step of adjusting the curvature includes the steps of:

fixing longitudinal ends of the mirror, the longitudinal ends defining a plane; and moving a central portion of the mirror relative to the plane to create curvature in the mirror.

* * * * *